United States Patent [19]

Guerder et al.

[11] 4,441,788
[45] Apr. 10, 1984

[54] OPTICAL WAVE GUIDE WITH FLUORINE-DOPED CORE

[75] Inventors: Pierre Guerder, Pithiviers; Andre Ranson, Rueil Malmaison, both of France

[73] Assignee: Quartz et Silice, Paris, France

[21] Appl. No.: 331,018

[22] Filed: Dec. 15, 1981

[30] Foreign Application Priority Data

Dec. 16, 1980 [FR]  France ................................ 80 26670

[51] Int. Cl.³ .............................................. G02B 5/172
[52] U.S. Cl. ................................. 350/96.34; 350/96.30
[58] Field of Search ................ 350/96.29, 96.30, 96.34

[56] References Cited

U.S. PATENT DOCUMENTS 4,221,825  9/1980  Guerder .......................... 350/96.34

Primary Examiner—David K. Moore
Assistant Examiner—Akm Ullah

[57] ABSTRACT

An optical waveguide is disclosed which exhibits only slight attenuation over both the visible and near infrared range. The waveguide comprises an optical fiber whose core is made up of a fluorine-doped silica glass possibly comprising an oxide that increases the index of refraction of said silica.

8 Claims, 1 Drawing Figure

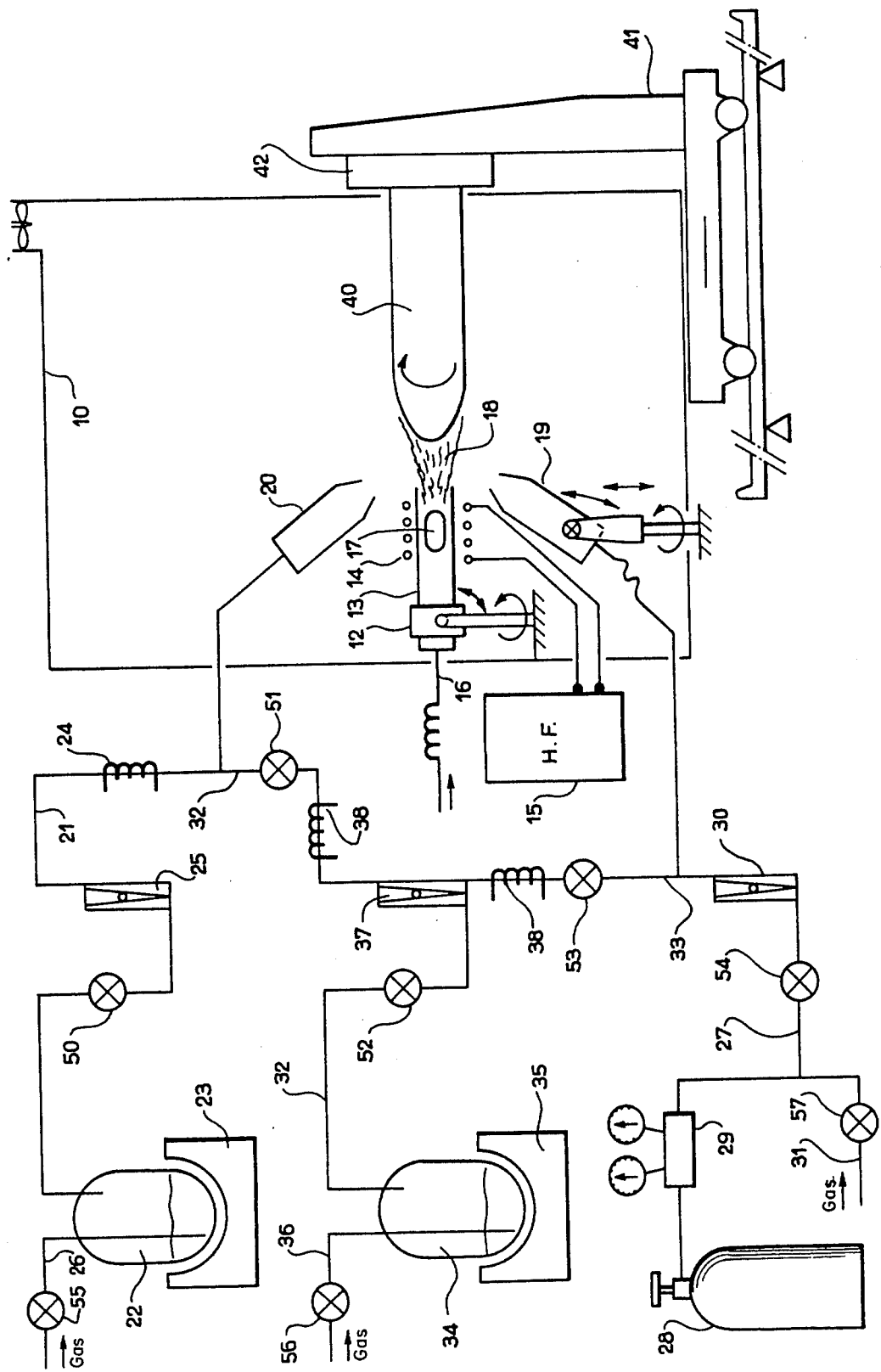

OPTICAL WAVE GUIDE WITH FLUORINE-DOPED CORE

TECHNICAL FIELD

This invention relates to optical waveguides and more particularly to a category of optical fibers which exhibit only a slight attenuation over a wide spectral range extending from the visible to the infrared.

BACKGROUND OF THE INVENTION

Optical fibers used for the transmission of light signals have a cylindrical structure in which the index of refraction of the central region of such structure is greater than the index of refraction of the periphery. It is conventional to refer to such central region as the core and to the periphery as the sheath or cladding. The numerical aperture of such a fiber increases with increasing divergence between the indices of refraction of the core and cladding.

It is known in this field that the best optical fibers are made of silica. It is also known that the index of refraction of silica can be modified by addition of doping elements, with titanium, aluminum or germanium oxides increasing the index of refraction and boron and fluorine decreasing it. Thus optical fibers with titanium-doped cores or fluorine-doped claddings are known in the art.

British Pat. No. 1,492,920, for example, describes a process of preparing vitreous silica, doped with fluorine and free of OH ions, by reaction of a silicon compound, such as $SiCl_4$, and a fluorine compound, with the oxygen contained in a hydrogen-free gaseous current in the flame of an induction plasma burner. The compound used to dope the silica is a fluorocarbon compound, namely, dichlorodifluoroemethane, $CCl_2F_2$, added in vapor form to the oxygen introduced in the plasma burner. This compound decomposes in the very hot flame of the plasma at the same time that $SiO_2$ is formed. The vitreous silica, thus doped with fluorine, is deposited radially on the surface of a cylindrical blank of pure silica or one doped with metal oxides. See also British Pat. Nos. 1,391,177 and 1,431,352 and Canadian Pat. No. 1,029,993. See also applicants' U.S. patent application Ser. No. 233,512 which is not part of the prior art. application Ser. No. 233,512 is incorporated herein by reference.

Advantageously, optical fibers should have the lowest possible transmission losses from absorption and diffusion. Such low losses, however, are typically achievable over only a limited spectral range. Thus, those types of optical fibers that are transparent in the infra-red region are not transparent in the visible region and vice versa.

One cause of light attenuation in optical fibers is structural defects. Such defects are typically caused during formation of the fiber, during heat treatment or during irradiation. Structural defects can be avoided by incorporating considerable quantities of hydroxyl groups into the silica. While this makes it possible to obtain optical fibers having low attenuation at wavelengths near 630 nanometer (nm), the hydroxyl ions produce intense absorption bands in the near infrared at 950 nm and longer wavelengths. Conversely, if the concentration of hydroxyl ions in the optical fiber is low (less than about 5 parts per million (ppm)) the optical fiber typically is not usable at wavelengths less than 640 nm because of light absorption caused by structural defects.

Further information concerning light absorption in optical fiber may be found in: Kaiser, et al., *Journal of the Optical Society of America*, Vol. 63, No. 9, p.1141 (1973); Friebele, et al., *Second European Symposium on Optical Fibers* (Paris 1976); Friebele, et al., *Appl. Phys. Lett.*, Vol. 24, p. 412 (1974).

SUMMARY OF THE INVENTION

In the present invention, a multi-purpose optical fiber has been devised which has sufficiently low attenuation that it is useful in both the near infrared and visible ranges of the spectrum. The optical fiber of the present invention has a core formed from a fluorine-doped silica glass that is virtually free of hydroxyl groups. Advantageously the core is uniformly doped with fluorine and further includes an oxide that increases the index of refraction of the core.

The silica which is the principal constituent of the glass that forms the core, can be made by any progress which permits the glass to be doped by sufficient quantities of fluorine. For example, the glass can be made by simultaneous thermal decomposition of at least a silicon compound and a fluorine compound in the presence of oxygen contained in a gas stream that is free of hydrogen. Advantageously, an additional element or elements may be added to this reaction mixture to increase the index of refraction of the glass when incorporated therein.

The preferred manufacturing process consists in decomposing the above-mentioned compounds in the flame of a plasma induction burner where they react with the oxygen contained in the feed gas of the burner to form doped silica. The doped silica is deposited as a vitreous mass on a heat-stable support.

These and other objects, features and advantages of optical fibers formed according to the invention will become more readily apparent in the following detailed description of the invention in which reference is made to the drawing which diagrammatically represents an apparatus for making doped silica.

DETAILED DESCRIPTION OF THE INVENTION

In the diagrammatic device of the drawing, a practically closed enclosure 10 protects a plasma burner from the ambient atmosphere. This burner comprises a silica tube 13 surrounded by an induction coil 14 electrically connected to a generator 15. Advantageously, generator 15 is a high-voltage (10 kilovolts), high-frequency (2 megahertz) device. The burner is mounted on an adjustable support 12 which permits its orienton to be varied. The silica tube has one end closed by a nozzle 16 through which are introduced a plasma-forming gas or gases such as air, oxygen, argon, nitrogen protoxide or their mixtures. It is imperative to choose a gas mixture containing oxygen that is free or combined to assure the chemical formation of $SiO_2$.

The plasma burner is started conventionally by first sending a gaseous argon current through nozzle 16 and introducing a grounded metal rod into the field of the induction coil. The argon is then replaced as quickly as possible with the plasma-forming gas. A plasma 17 is then produced in a "flame" which reaches very high temperatures on the order of 10,000° C.

The nozzles 19 and 20 are placed on the outside of the plasma burner, preferably on each side of silica tube 13, crosswise to and directed toward the flame. The nozzles are advantageously mounted on supports that make it possible to direct them at will, as shown in FIG. 1 for nozzle 19.

Nozzle 20 is connected by a pipe 21 to an evaporator 22 containing a compound of silicon, for example, silicon tetrachloride in the liquid state, which is heated by a heating device 23. The SiCl$_4$ vapors are entrained by a vector gas which is piped into evaporator 22 by a pipe 26. The entrained vapors are then piped through pipe 21 and nozzle 20 to the plasma flame. This vector gas is preferably oxygen but can also be nitrogen or argon if the plasma-forming gas is rich in oxygen. A heating resistor 24 is placed around pipe 21 to prevent condensation of the silicon tetrachloride vapors that circulate therein. A flowmeter 25, inserted in the circuit, indicates the amount of tetrachloride evaporated per unit of time.

Nozzle 19 is connected by a pipe 27 to a tank 28 that contains a fluorine product under pressure. Fluorine-doped silica can be obtained with a good yield preferably by using an inorganic fluorine compound such as sulfur hexafluoride SF$_6$, nitrogen trifluoride NF$_3$, or their mixtures. Pipe 27 is fitted with a reducing valve 29 and a flow-meter 30. Advantageously, a vector gas such as dry oxygen can be introduced by pipe 31.

Nozzles 19 and 20 are also connected by pipes 32 and 33 to an evaporator 34 which is heated by a heating device 35. Evaporator 34 contains a compound of an element that increases the index of refraction of the silica. This compound can be a titanium compound, for example titanium tetrachloride TiCl$_4$.

The TiCl$_4$ vapors are entrained by a vector gas which is piped into evaporator 34 by a pipe 36. The composition of this vector gas is identical to that of the gas supplied by pipe 26. Heating resistors 38 surround pipes 32, 33 to prevent condensation of the TiCl$_4$ vapors on its walls. A flowmeter 37 indicates the amount of tetrachloride evaporated per unit of time.

The vector gas or gases, like the plasma-forming gases, must be rigorously dry and are dried, if necessary by a drying machine (not shown).

In practicing the invention, the doped silica is deposited axially on a blank 40 of regular grade vitreous silica. This blank is carried by a mobile device 41 that includes apparatus that positions the blank in front of the flame and moves it in translation in relation to the flame in the direction indicated by the arrow on device 41. In addition, during the entire period of the operation, a known type of mechanical mounting comprising a mandrel 42 rotates blank 40 in the direction indicated by the arrow on blank 40. This rotation is necessary to obtain a cylindrical ingot of uniform diameter.

To obtain a deposit of homogeneous and transparent glass it is important to operate under stable conditions, in particular by maintaining the translation and rotation speeds of the blank. The length of the ingot finally obtained is between 30 and 100 centimeters and its diameter between 70 and 90 millimeters.

By the appropriate opening and closing of valves 50 to 57, it is possible to vary in the ingot the concentration of the fluorine and/or the concentration of the oxide of the element that increases its index of refraction. If the ignot is formed of a silica enriched with the oxide of the element that increases its index of refraction, the ingot may be covered in a second operation with a cladding comprising a radial deposit of silica merely doped with fluorine, and then may be covered with a protective layer or jacket of pure silica. This is obtained by mounting the ingot on a glass lathe which drives it by rotation while moving with a back-and-forth movement, perpendicularly to the flame of the plasma.

After the ingot is formed, it is placed in a vertical drawing furnace to be transformed into transparent rods several meters long whose diameter is between 10 and 20 millimeters. These rods in turn, after a careful cleaning of their surface, are drawn by known means into fibers with a diameter of 0.125 to 1 millimeter.

Optical fibers made according to the invention are illustrated below by examples taken from two categories of fibers: those exhibiting a "plastic" coating and those made entirely of glasses of various compositions.

In the first category are fibers drawn from silica ingots doped only with fluorine, in weight percentage between 0.2 and 1%. The core of the fibers, made of silica containing a uniform percentage of fluorine, is simply surrounded, in accordance with a known method, with a standard silicone resin cladding, and is covered in turn with a protective jacket or coating. Fibers of this type, labeled F1, F2, F3, F4 in table I, contain respectively 0.2%, 0.45%, 0.8%, 1% fluorine (expressed in weight percentages). The core of these fibers has a diameter of 200 $\mu$m, is covered with a silicone resin layer of 50 $\mu$m, and is covered in turn with a protective coating whose thickness is 150 $\mu$m.

In Table I these fibers are compared with standard fibers, designated by A and B, which are covered in the same manner and whose core is made respectively of virtually pure silica containing about 30 ppm of hydroxyl groups and of silica containing between 200 and 250 ppm of hydroxyl groups. Table 1 gives the initial values of the attenuation exhibited by these fibers, in dB/km, for the wavelengths ($\lambda$) indicated.

TABLE I

| $\lambda$ | A | B | F1 | F2 | F3 | F4 |
|---|---|---|---|---|---|---|
| 630 nm | 25 | 15 | 20 | 17 | 11 | 10 |
| 800 nm | 4.8 | 5 | 3.5 | 4.5 | 4 | 3.5 |
| 820 nm | 4.9 | 5.1 | 3.5 | 3.2 | 3.2 | 3 |
| 945 nm | 35 | >50 | 25.4 | 24.5 | 16.8 | 7.5 |
| 1050 nm | 5.6 | 8 | 4.3 | 5.7 | 6.8 | 5.1 |

This table calls for several remarks.

First of all, the comparison between fibers A and B shows that the presence of OH ions in the synthetic silica greatly diminishes the attenuation at 630 nm, thus confirming the results of hypotheses already known. On the other hand, the same OH ions cause an absorption at 945 nm which increases with concentration as is well-known.

The comparison between the fibers of the invention and fibers A and B shows that the incorporation of fluorine into the synthetic silica has a double effect:

whereas fiber A and fibers F1 to F4 have been drawn from ingots made under identical conditions, it is found, according to the attenuations measured at 945 nm, that the amount of OH decreases considerably as the amount of fluorine increases;

it is also found, according to the attenuations measured at 630 nm, that the incorporation of fluorine has the effect of reducing, even eliminating the defects that normally appear during the drawing of a silica containing little or no OH ions. It is equally noteworthy that this effect is observed despite the decrease in the amount of OH.

The reduction in attenuation from the use of fluorine increases with increasing concentration. It is significant at concentrations of about 0.5% (weight percentage) and is greatest at about 0.8 to 1.0%. Above 1% fluorine the influence of this element on the attenuation becomes negligible, particularly at 630 nm where, for fiber F4, the measured loses are due essentially to Rayleigh scattering.

The fibers according to the invention exhibit a remarkable resistance to the action of all ionizing radiation, or more precisely, rapidly recover their initial properties. That is demonstrated by the following experiment performed, by way of example, on the previously described fibers.

Standard fibers A and B and fibers F1, F2 and F4 were exposed for one hour to gamma radiation from a Cobalt 60 source. The average dose received by the fibers by the end of this exposure was on the order of 100,000 rads. Table II shows the development of the attenuation with respect to time T immediately after the end of this treatment. The values appearing in this table are expressed in dB/km and result from measurements made at 800 nm.

TABLE II

| T | A | B | F1 | F2 | F4 |
|---|---|---|---|---|---|
| + 2 min. | ≧550 | ≈215 | | | ≈120 |
| + 5 min. | ≧550 | | | | ≈85 |
| + 15 min. | ≧550 | | | | ≈80 |
| + 30 min. | ≧550 | ≈200 | | ≈120 | ≈75 |
| + 60 min. | ≧550 | ≈190 | ≈125 | ≈100 | ≈40 |

Immediately after the end of the exposure to the ionizing radiation the fibers are distinguished by very different attenuation. If we compare fibers A and B, we readily see the beneficial effect of the OH ions described in the prior art. Also apparent is the very rapid decrease in attenuation observed in the fibers made according to the invention. This development is all the more pronounced with increasing concentration of fluorine.

With respect to optical fibers made entirely of glasses of various compositions, remarkable properties may also be observed in optical fibers made according to the invention.

Prior art optical fibers whose core is made of titanium-doped silica are used in the near infrared because they exhibit a slight attenuation in the ranges of wavelengths between 1000 and 1200 nm and between 1500 and 1700 nm. These fibers, however, exhibit too great an attenuation below 800 nm to be used in the short wavelength region.

The properties of these fibers can be partially improved by subjecting them to a temperature higher than 150° C. for several days. While this treatment considerably improves the transmission of said fibers between about 700 and 800 nm, an intense absorption band is created centered on 950 nm and extending from 800 to 1100 nm.

As shown in Table III, optical fibers made according to the invention essentially escape these drawbacks. Fibers labeled TF1 and TF2 comprise a core of silica simultaneously doped with titanium and fluorine that is covered with a layer of silica doped only with fluorine which in turn is covered with a layer of non-doped silica that serves only for mechanical protection of the fiber. The core has a diameter of 200 μm and is covered by a fluorine-doped silica layer of 45 μm thickness. The core of these fibers contain respectively, in weight percentages, 0.2% fluorine associated with 2.25% $TiO_2$ (TF1) and 0.4% fluorine associated with 1.55% $TiO_2$ (TF2).

In Table III, the fibers made according to the invention are compared to a known fiber, labeled C, whose core is made of silica doped with 3% by weight $TiO_2$. Table III compares the attenuation (in dB/km) exhibited by these fibers before and after a heat treatment at various wavelengths (λ). This treatment consisted in subjecting these fibers to temperatures equal to or greater than 170° C. for at least 3 days.

TABLE III

| λ | C | | TF1 | | TF2 | |
|---|---|---|---|---|---|---|
| | virgin | treated | virgin | treated | virgin | treated* |
| 630 nm | >100 | >100 | 50 | 10 | 35 | 17 |
| 800 nm | 30 | 12.5 11 | 8.5 | 22 | 12 | |
| 950 nm | 20 | >100 | 27 | 40 | 33 | 25 |
| from 1100 to 1200 nm (average value) | 10 | 8 | 6 | 7 | 7 | 3.5 |
| 1300 nm | >100 | >100 | 15 | 16 | 12 | 5 |
| 1600 nm | 11 | 7.5 | 6.5 | 1.7 | | 2 |

*The values of the attenuation exhibited by the TF2 fiber after heat treatment are obtained after correction for the losses due to the microcurves.

Fiber C exhibits some zones of slight or medium attenuation enclosed between strong or very strong peaks of absorption, centered on 630, 945 and 1350 nm.

Compared with it, Table III reveals the remarkable transparency of the fibers made according to the invention. Such fibers are distinguished by more numerous and wider areas of slight or very slight attenuation, especially after heat treatment. Thus, the absorption at 630 nm due to defects that appear during the drawing of the fibers decreases considerably and virtually disappears after heat treatment. The absorption at 950 nm is less pronounced. At 1300 nm a new region appears that is characterized by an attenuation sufficiently weak to make it possible to use this wavelength. In a general way, the attenuations are reduced to attain on occasion extremely small values.

The action of fluorine is evident even at small concentrations. It is therefore possible to obtain a substantial improvement in the properties of the core silica without experiencing the drawbacks caused by too large a concentration of fluorine, namely too small a gap between the indices of refraction of the core and the cladding which surrounds it.

The concentration of titanium and fluorine of the core of optical fibers TF1 and TF2, given as nonlimiting examples, is uniform. It is possible, while staying within the scope of the invention, to produce fibers whose core contains a uniform amount of fluorine, associated with concentrations of a doping element (for example titanium, germanium, phosphorous) decreasing radially from the axis of said fiber. In a general way, the equilibrium between the doping element that increases the index of refraction of the core silica and the fluorine is to be determined as a function of the nature of said element and the characteristics desired for the fiber.

What is claimed is:

1. An optical waveguide formed with a core made of a vitreous material containing fluorine and coated with at least a distinct peripheral layer, wherein the core of said waveguide is made of a silica glass in which fluorine is uniformly distributed.

2. An optical waveguide according to claim 1 wherein the index of refraction of the core is constant.

3. An optical waveguide according claim 1 wherein the core of said waveguide is made of a glass containing exclusively silica and fluorine.

4. An optical waveguide according to claim 3 wherein the percentage of fluorine incorporated in the silica is at least 0.5% by weight.

5. An optical waveguide according to claim 1 wherein the silica glass that forms the core of said waveguide contains at least an oxide of an element which increases the index of refraction of said glass.

6. An optical waveguide according to claim 5 wherein the element that increases the index of refraction of the glass exhibits a concentration that decreases from the axis of said waveguide.

7. An optical waveguide according to claim 5 wherein the element that increases the index of refraction of the glass that forms the core of said waveguide is titanium.

8. An optical waveguide according to claim 7 wherein the percentage of fluorine incorporated in the silica is less than or equal to 0.5% by weight.

* * * * *